United States Patent
Flint et al.

(10) Patent No.: US 8,880,424 B1
(45) Date of Patent: Nov. 4, 2014

(54) DIGITAL ADVERTISING METHOD AND SYSTEM

(71) Applicants: Ortho Flint, London (CA); Stephen Richard Horne, Denfield (CA)

(72) Inventors: Ortho Flint, London (CA); Stephen Richard Horne, Denfield (CA)

(*) Notice: Subject to any disclaimer, the term of this patent is extended or adjusted under 35 U.S.C. 154(b) by 0 days.

(21) Appl. No.: 14/072,338

(22) Filed: Nov. 5, 2013

(51) Int. Cl.
  *G06Q 30/00* (2012.01)
  *G06Q 30/02* (2012.01)
  *G06F 3/0481* (2013.01)

(52) U.S. Cl.
  CPC ........ *G06Q 30/0277* (2013.01); *G06Q 30/0276* (2013.01); *G06Q 30/02* (2013.01); *G06F 3/0481* (2013.01)
  USPC ............ 705/14.73; 705/14.72; 715/794; 715/798; 715/801; 345/668

(58) Field of Classification Search
  CPC .......... G06Q 30/2041; G06Q 30/0277; G06Q 30/0241; H04N 21/8358; H04N 21/4307; H04N 21/4438; H04N 21/23614; G11B 20/00884; G09G 5/14; G09G 2370/027
  See application file for complete search history.

(56) References Cited

U.S. PATENT DOCUMENTS

| | | | |
|---|---|---|---|
| 6,034,661 A * | 3/2000 | Servan-Scheiber et al. | .. 345/668 |
| 6,205,432 B1 | 3/2001 | Gabbard et al. | |
| 6,633,850 B1 | 10/2003 | Gabbard et al. | |
| 8,266,522 B2 | 9/2012 | Dugonjic et al. | |
| 2002/0156679 A1* | 10/2002 | Castle | ............ 705/14 |
| 2004/0078304 A1* | 4/2004 | Gabbard et al. | ......... 705/27 |
| 2006/0004630 A1* | 1/2006 | Criddle et al. | ......... 705/14 |
| 2009/0150239 A1 | 6/2009 | Dorman | |
| 2010/0269030 A1* | 10/2010 | Dugonjic et al. | ........ 715/207 |
| 2012/0127198 A1 | 5/2012 | Gundavarapu | |

OTHER PUBLICATIONS http://www.whisperads.com, Nov. 5, 2013.

* cited by examiner

*Primary Examiner* — Jami A Plucinski
*Assistant Examiner* — Rashida Shorter
(74) *Attorney, Agent, or Firm* — Kagan Binder, PLLC

(57) ABSTRACT

The present invention provides a method and system for inserting a digital advertisement into a window by a computer processor for display on a screen. First, an initial portion of the window containing only text is identified that is of sufficient size to accommodate the advertisement. Next the advertisement is inserted into the identified initial window portion behind the text so that the text is readable. Then, the color of the advertisement or of a portion of the text is subsequently adjusted so that the advertisement becomes more prominent. The text may contain text-related graphics and the advertisement may be placed as not to obstruct any such graphs. As a user scrolls the underlying content, the advertisement is then moved.

24 Claims, 14 Drawing Sheets

Hey everybody!

Here we are in Ottawa at the new national memorial dedicated to animals that have served in war. The Animals in War Dedication has footprints of dogs, horses and mules, to remind us of the mark they left on the battlefield. There are also three bronze plaques that have carved images and interesting facts about the animals, their sacrifices, and their loyalty to their human friends. A life-size bronze dog sits, wearing a medical badckpack that some war dogs carried

Fig. 4a

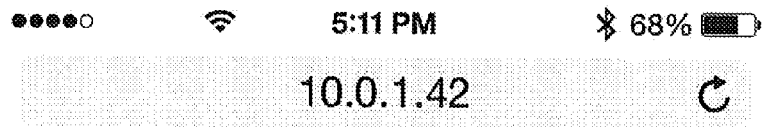

Hey everybody!

Here we are in Ottawa at the new national memorial dedicated to animals that have served in war. The Animals in War ▒▒▒▒ion has footprints ▒f do▒▒▒▒▒▒▒d mules, to remin▒▒▒▒f ▒▒▒▒▒k they left on the battle▒▒▒▒▒▒▒▒▒ also three bronze plaq▒▒s that ▒▒▒ carved images and intere▒▒▒▒▒cts about the animals, their sacrifices, and their loyalty to their human friends. A life-size bronze dog sits, wearing a medical badckpack that some war dogs carried

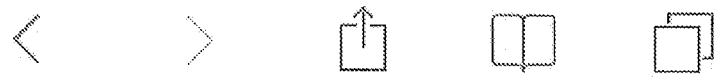

Fig. 4c

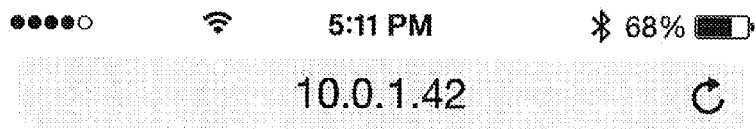
Hey everybody!
Here we are in Ottawa at the new national memorial dedicated to animals 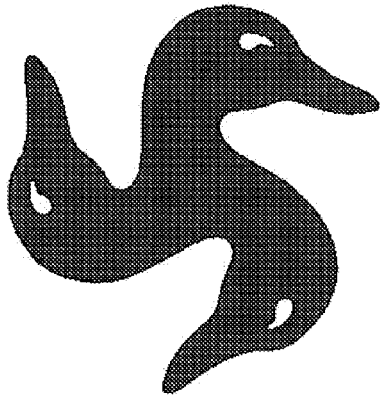 . The Animal: footpri ules, to remi :ft on the batt iree bronze | images ut the animals :ir loyalty to their human friends. A life-size bronze dog sits, wearing a medical badckpack that some war dogs carried
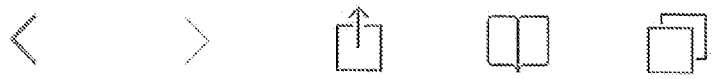
Fig. 4d

●●●○○　　　🛜　　　9:33 PM　　　$ 60% 🔋

≡　　　　　10.0.1.42　　　　　↻

WHAT IS THE IDEA?

We have only started on our development of our country--we ha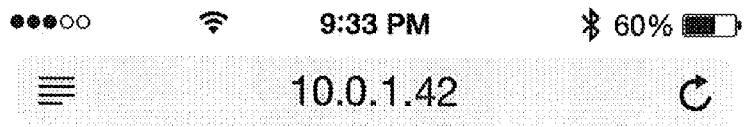th all our talk of wonderful p n scratch the surface. T erful enough-- e have done wit past accompl we consider ly in ploughing e industrial establishme ether, an inkling comes tunity there is ahead. And now, countries of the world in ferment and with so much unrest every where, is an excellent time to suggest something of the things that may be done in the light of what has been done.

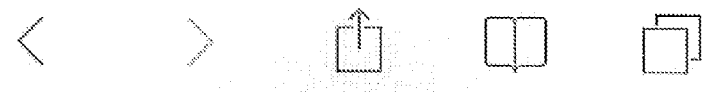

Fig. 5

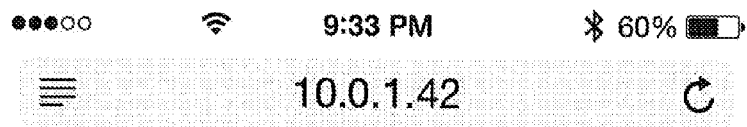

WHAT IS THE IDEA?

We have only started on our development of our country--we have, in spite of all our talk of wonderful progress, done more than scratch the surface. The progress has been wonderful enough--but when we compare what we have done with what there is to do, then our past accomplishments are as nothing. When we consider that more power is used merely in ploughing the soil than is used in all the industrial establishments of the country put together, an inkling comes of what opportunity there is ahead. And now, with so many countries of the world in ferment and with so much unrest everywhere, is an excellent time to suggest something of the things that may be done in the light of what has been done.

Fig. 6

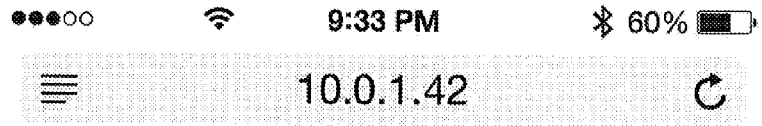

WHAT IS THE IDEA?

We have only started on our development of our country--we have not as yet, with all our talk of wonderful progress, done more than scratch the surface. The progress has been wonderful enough--but when we compare what we have done with what there is to do, then our past accomplishments are as nothing. When we consider that more power is used merely in ploughing the soil than is used in all the industrial establishments of the country put together, an inkling comes of how much opportunity there is ahead. And now, with so many countries of the world in ferment and with so much unrest every where, is an excellent time to suggest something of the things that may be done in the light of what has been done.

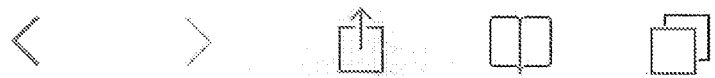

Fig. 7

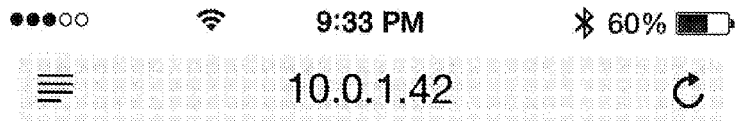

WHAT IS THE IDEA?

We have only started on our development of our country--we have not as yet, with all our talk of wonderful progress, done more than scratch the surface. The progress has been wonderful enough--but when we compare what we have done with what there is to do, our past accomplishments are as nothing. When we consider that more power is used merely in ploughing the soil than is used in all the industrial establishments of the country put together, an inkling comes of how much opportunity there is ahead. And now, with so many countries of the world in ferment and with so much unrest every where, is an excellent time to suggest something of the things that may be done in the light of what has been done.

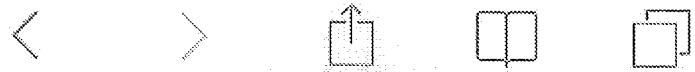

Fig. 8a

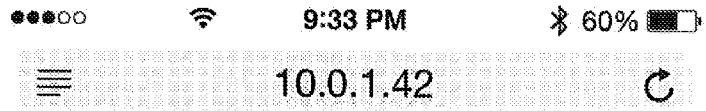

WHAT IS THE IDEA?

We have only started on our development of our country--we have ??? with all our talk of wonderful p?? ??? ?? scratch the surface. Th?? ??? has been ?? ??erful enough--b?? ??? ?? co?? ?? ??e have done with ?? ?? is to ?? ?? past accompli?? ??ts a?? as nothi?? ?? we consider ?? ??more p?? is used ?? y in ploughing ?? ??sed in ?? e industrial establishme?? ?? ??ry ?? ??ether, an inkling comes ?? ?? ??tunity there is ahead. And now, w?? ??ny countries of the world in ferment and with so much unrest every where, is an excellent time to suggest something of the things that may be done in the light of what has been done.

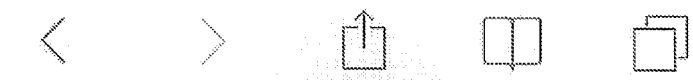

Fig. 8b

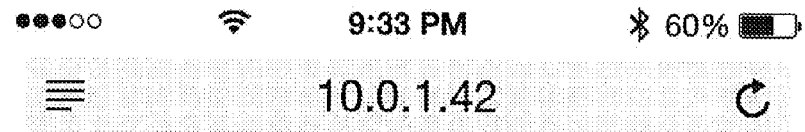

WHAT IS THE IDEA?

We have only started on our development of our country--we have not．．．．．with all our talk of wonderful prog．．．．．．．scratch the surface. The．．．．．．．．．rful enough--b．．．．．．．．．have done with．．．．．．．．．st accompli．．．．．．．．．．．e consider t．．．．．．．．．．in ploughing．．．．．．．．．industrial establishme．．．．．．．．ther, an inkling comes o．．．．．．．unity there is ahead. And now, wi．．．．．．countries of the world in ferment and with so much unrest every where, is an excellent time to suggest something of the things that may be done in the light of what has been done.

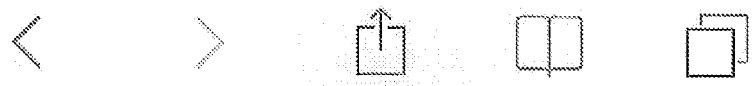

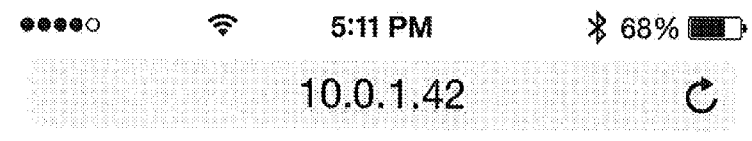

The genius of van Gogh

One can only imagine how exquisite a freshly painted canvas from the hand of van Gogh, would have been to gaze upon. We only have aged and sometimes over varnished examples of his masterworks. But even these demonstrate the power of his expression with colour and absorbing brush strokes, that one becomes lost within  the painting, back to a time of purity that never was. Is it any wonder that he captivates us, letting us experience the breath taking beauty of nature with no emotional baggage that comes with adulthood. Although we describe him as a sacrificial sheep to art, he was no such thing, but rather a man of

Fig. 9a

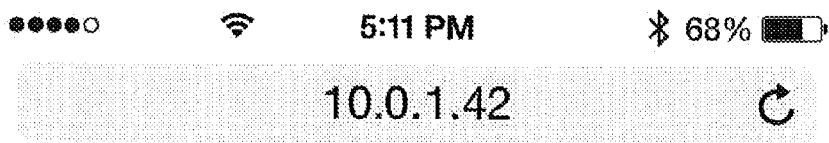

varnished examples of his masterworks. But even these demonstrate the power of his expression with colour and absorbing brush strokes, that one becomes lost within

the painting, back to a time of purity that never was. Is it any wonder that he captivates us, letting us experience the breath taking beauty of nature with no emotional baggage that comes with adulthood. Although we describe him as a sacrificial sheep to art, he was no such thing, but rather a man of passion so instense and refined, that it is understandable to envy him. As we do not wish to believe that people who commit unsavoury acts have anything in common with us, we also do not want to accept someone who could love

    

Fig. 9b

DIGITAL ADVERTISING METHOD AND SYSTEM

FIELD OF THE INVENTION

The present invention relates generally to digital manipulation of a display containing text, and more particularly to the placement of digital advertisements in a display screen behind text.

BACKGROUND OF THE INVENTION

Advertising on computer systems that are used to view content containing text has typically been done by inserting advertisements in a window containing the text beside, above or below the text, thus taking up screen real estate. This is particularly a problem for mobile devices that have small screens where users do not want portions of the screen space to display advertising. Rather, users generally want to be able to use the entire available screen for viewing the content that they are reading. Such content, in addition to containing text, may include text-related graphics which may be referenced in the text.

It would be desirable to provide a method of displaying an advertisement on a computer screen, and particularly a small computer screen, that does not reduce the amount of space available for content that the user intended to view, still allows the user to read all the content and view any text-related graphics, but still makes the advertisement sufficiently prominent that the user takes note of it and may thereby be influenced by it.

SUMMARY OF THE INVENTION

The following presents a simplified summary of the disclosure in order to provide a basic understanding to the reader. This summary is not an extensive overview of the disclosure and it does not necessarily identify key/critical elements of the invention or delineate the scope of the invention. Its sole purpose is to present some concepts disclosed herein in a simplified form as a prelude to the more detailed description that is presented later.

The invention provides a method for inserting a digital advert into a window by a computer processor for display on a screen. The window contains content including text. The method first involves identifying an initial portion of the window. Then, the advert is inserted into the identified initial window portion behind the content so that any text in front of the advert is readable. Subsequently the colour of the advert is adjusted so that the advert becomes more prominent.

The window may also contain text-related graphics, and the initial window portion may be selected so that it contains only text and does not contain any portion of the text-related graphics.

The size or location of the advert may also be subsequently adjusted to make the advert more prominent.

The identified initial window portion may be selected to be at least as large as a pre-determined minimum size specification associated with the advert, and the advert may be scaled to fit in the identified initial window portion.

The identified initial window portion may be selected to be centred on a point as close as possible to the centre of the window such that the window portion contains only text.

The identified initial window portion may be selected to be as large as possible.

Inserting the advert into the identified initial window portion may include adjusting the colour of the advert or adjusting the colour of a portion of the text so that the text is readable.

Inserting the advert into the identified initial window portion may include scaling the size of the advert to the largest size that will fit in the identified initial window portion.

The advert may be made more prominent by darkening at least a portion of the advert. The darkness of the advert may be continuously increased for a period of time.

Subsequent to inserting the advert into the identified initial window portion behind the text, the advert may be made more prominent by placing the advert in front of the text for a period of time.

The advert may be maintained in the window for a pre-determined duration, and then be removed from the window.

Inserting the advert into the identified initial window portion may include lightening the advert so that the advert appears to be translucent and so that the text is readable.

Inserting the advert into the identified initial window portion may include adjusting the attributes of a portion of the text so that the text is readable.

The user may be able to scroll the text in the window. When the user scrolls the text, a portion of the window containing only text, the window portion being at least as large as a pre-determined minimum size specification associated with the advert, may be newly identified. Then the advert may be moved to the newly identified window portion behind the text so that the text is readable. The newly identified window portion may be selected to be as close as possible to the previous location of the advert. The size of one or more of the newly identified window portions may be chosen to be as large as possible, and the advert may be scaled up or down to the largest size that fits in the newly identified window portion. After the advert is moved, the colour of the advert may be adjusted or one or more attributes of a portion of the text may be adjusted so that the text is readable. The window may further contain text-related graphics and the initial window portion and newly identified window portions may be selected so that they do not contain any portion of the text-related graphics.

A user may be able zoom the window. When the user zooms the window, a portion of the window containing only text, the window portion being at least as large as a pre-determined minimum size specification associated with the advert, may be newly identified. The advert may then be scaled to fit in the newly identified window portion and be moved to the newly identified window portion behind the text so that the text is readable. The newly identified window portion may be selected to be as close as possible to the previous location of the advert.

The location of the advert may be moved over time within the window, independent of any user actions.

A user may be able to scroll content displayed in the window, and if the user scrolls the content at a rate exceeding a first pre-determined rate, then the advert may be moved in front of the contents until the rate of scrolling drops below a second pre-determined rate.

The invention also provides an advertising system for displaying an advert. The system includes a computer processor, a display screen on which the processor can display content, a non-transitory memory readable by the processor, and software stored in the memory for execution by the processor. The software is configured to cause the processor to perform the following steps:

(i) display a window containing content including text on the screen;
(ii) identify an initial portion of the window;
(iii) insert the advert into the identified initial window portion behind the content so that any text in front of the advert is readable; and
(iv) subsequently adjust the colour of the advert so that the advert becomes more prominent.

The window displayed by the system may also contain text-related graphics, and the initial window portion may be selected so it contains only text and does not contain any portion of the text-related graphics. The identified initial window portion may be selected to be at least as large as a pre-determined minimum size specification associated with the advert, and the advert may be scaled to fit in the identified initial window portion. A user may be able to scroll the text in the window, and when the user scrolls the text, a portion of the window containing only text, the window portion being at least as large as a pre-determined minimum size specification associated with the advert, may be newly identified, and the advert may then be moved to the newly identified window portion behind the text so that the text is readable.

The invention also provides a method, and a corresponding system that performs the method, for inserting a digital advert into a window by a computer processor for display on a screen. The window contains text and text-related graphics. The method includes the steps of:
(a) identifying an initial portion of the window containing only text and not containing any portion of the text-related graphics; and
(b) inserting the advert into the identified initial window portion behind the text so that the text is readable.

In this method, inserting the advert into the identified initial window portion may include adjusting the colour of the advert or adjusting the attributes of the obstructing text portions so that the text is readable. The identified initial window portion may be selected to be at least as large as a pre-determined minimum size specification associated with the advert, and the advert may be scaled to fit in the identified initial window portion. A user may be able to scroll the text on the screen, and when the user scrolls the text, a portion of the window containing only text and not containing any portion of the text-related graphics, the window portion being at least as large as a pre-determined minimum size specification associated with the advert, may be newly identified. The advert may then be moved to the newly identified window portion behind the text so that the text is readable. The newly identified window portion may be selected to be as close as possible to the previous location of the advert. The method and system may further contain other features described above.

The invention also provides a method, and a corresponding system that performs the method, for inserting a digital advert into a window by a computer processor for display on a screen. The window contains content, which includes text, and the content is scrollable by a user. The method includes the steps of:
(a) identifying an initial portion of the window;
(b) inserting the advert into the identified initial window portion behind the content so that any text in front of the advert is readable; and
(c) if the user scrolls the content at a rate exceeding a first pre-determined rate, then the advert is moved in front of the contents until the rate of scrolling drops below a second pre-determined rate.

The first and second pre-determined rates may be the same. The method and system may further contain other features described above.

BRIEF DESCRIPTION OF THE DRAWINGS

FIG. 4*a* shows the advert of FIG. 1 behind text in a screen so that the advert partly obstructs the text.
FIG. 4*c* shows an even later version of the screen of FIG. 4*a* with the advert further darkened.
FIG. 4*d* shows a later version of the screen of FIG. 4*c* in which the advert has been brought forward so that the advert completely obstructs a portion of the text.
FIG. 5 shows the advert of FIG. 3*b* behind text.
FIG. 6 shows the advert of FIG. 3*b* behind text, a portion of the text having been darkened.
FIG. 7 shows the advert of FIG. 2 behind text, a portion of the text having been darkened.
FIG. 8*a* shows the advert of FIG. 3*b* behind text.
FIG. 8*b* shows a later version of the screen of FIG. 8*a* with the outer portion of the advert having been darkened.
FIG. 8*c* shows an even later version of the screen of FIG. 8*a* with the advert in front of the text so that the advert completely obstructs the obstructed portion of the text.
FIG. 9*a* shows the advert of FIG. 2, having been scaled and placed behind text in a window displayed on a screen.
FIG. 9*b* shows the screen of FIG. 9*a* after a user has scrolled the text and text-related graphic, and the advert of FIG. 2 has been moved.

FIGS. 4 to 9 are all examples of the screen of a notional mobile device, such as an iPad™, with a single window that takes up most of the screen space. The window contains text, an advert, and, in FIG. 9, a text-related graphic. The content of the window may be scrollable and zoomable by a user. At the top of each screen typical icons and numbers are shown representing signal strength of a wireless connection, the current time, and the amount of power remaining in the battery of the mobile device are shown. At the bottom of the screen, typical navigational aids are displayed. These are not part of the invention.

DETAILED DESCRIPTION OF THE INVENTION

Figure 1:
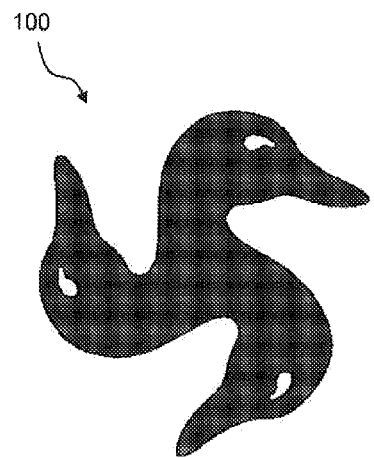
FIG. 1 is a single colour advert, being dark blue.
Figure 2:
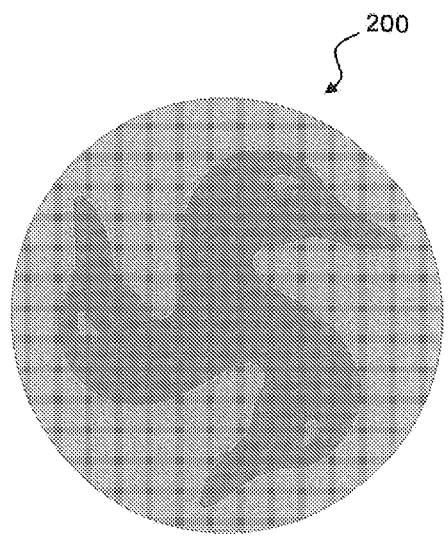
FIG. 2 is a two-colour advert with a grey outer portion and light blue inner portion, the blue inner portion being a lighter coloured version of the advert of FIG. 1.

FIGS. 1 to 3 show examples of adverts, which may also be referred to as advertisements or ads. The adverts shown in the figures are all graphic images, which are generally defined by a rectangular pixel map. The size of the bounding rectangle is selected to provide sufficient resolution to render the graphic image to the satisfaction of the person or entity who wishes to use the image to advertise a product or service, or to simply convey a message. Such a person or entity will be referred to as an advertiser.

For example, the single colour advert 100 of FIG. 1 may be about 800 by 800 pixels, with each pixel being represented by digital values in a particular colour space, such as YUV, HSV or RGB. Generally such spaces are three dimensional so that the pixel may comprise, for example, 24 bits, where 8 bits specify the intensity, which may also be referred to as luminance, lightness or brightness, 8 bits define the hue and 8 bits define the saturation. The full pixel value may be referred to as the "colour" of the pixel. Changing the "colour" of a pixel, an image, or a portion of an image therefore includes changing one or more of the hue, saturation and luminance, either directly, when an HSL encoding is employed, or indirectly. Many such approaches to encoding colour values as pixels are known.

An advert can be scaled to be larger or smaller using well-known resampling techniques. Alternatively multiple versions of an advert may be pre-defined having different sizes, and scaling may then effectively be performed simply by selecting a version of the advert having a particular size. An advert may have an associated minimum size, which may be specified either in pixels or in physical screen size, or even a combination of these, which specifies the smallest acceptable size to which the advert may be scaled for purposes of display to a user. Alternatively, the minimum size may be specified as a percentage of the display screen size. Generally the minimum size specification will include a specification of the minimum width and minimum height. An advert may also have an associated maximum size, which is generally a specification of the maximum width and maximum height to which the advert may be scaled. Preferably adverts are scaled the same amount in height and width so as to maintain their aspect ratio, although this is not essential and some adverts may allow for differential scaling.

By changing the colour of the advert, its appearance may be changed. For example, the light blue inner portion of advert 200 has been formed by lightening the advert 100 of FIG. 1. Lightening generally makes the advert less prominent whereas darkening makes it more prominent.

FIGS. 2 and 3 show examples of two-colour adverts. There is no need to restrict adverts to any particular number of colours, although this may be preferable for the purposes of the advertising system and method described herein. It should be noted that references to "the colour" of an advert are not intended to imply that the advert has a single colour. Rather "the colour" of an advert refers to all the colours used in the advert, so that "adjusting the colour" of an advert, unless expressly stated or clearly implied otherwise herein, may include adjusting colours (and any components thereof) of multiple differently coloured portions of the advert. A portion could be any number of contiguous pixels, down to a single pixel.

Figure 3A:
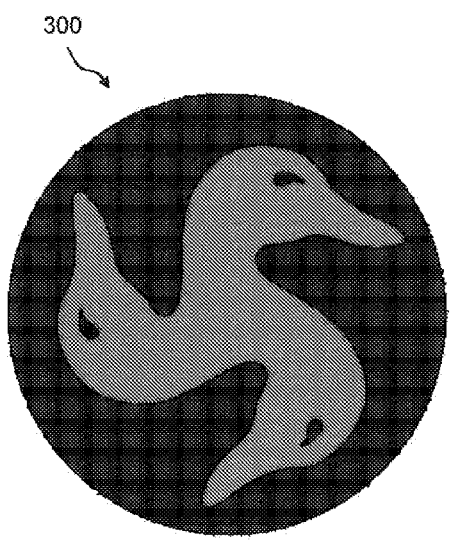
FIG. 3*a* is a two-colour advert with a dark burgundy outer portion and blue inner portion.
Figure 3B:
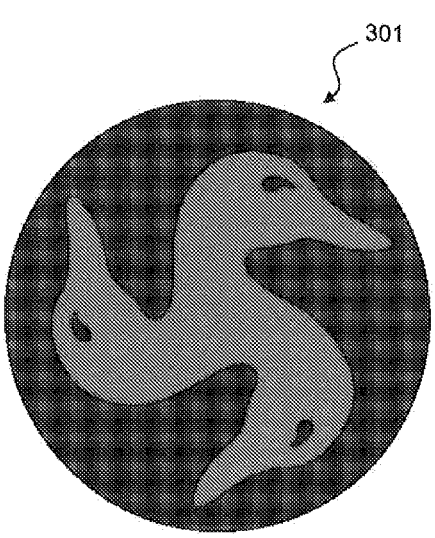
FIG. 3*b* is the advert of FIG. 3*a* with the outer portion having been lightened.

FIG. 3a shows a two-colour advert 300 having an inner portion comprising a lightened version of the advert 100 of FIG. 1, and an outer portion being a deep burgundy hue. The colour of the inner and outer portions of the advert 300 may be separately varied. For example, the advert 301 of FIG. 3b was formed by lightening the outer portion of the advert 300 without changing the colour of the advert 301 of FIG. 3b.

In its simplest form, the method involves obtaining an advert, such as the advert 100 of FIG. 1 and inserting it into a window displayed on a screen that contains text so that the advert 100 is displayed behind the text so that the text remains readable to a normal person. Portions of the text in front of the advert at least partially, and generally completely, obstruct portions of the advert behind the obstructing text portions. It is preferred that the text is always readable, even if the colour of the advert is adjusted to make the advert more prominent. In some cases the advert may be permitted to obstruct text to the point that some of the text is not readable or visible, but it is preferred that this is only done for relatively short periods. It is preferred that the advert is inserted so that the only content in front of the advert is text, but this is not essential.

A screen, such as that shown in FIGS. 3-9, may be a screen of a mobile device, such as an iPad™, or an iPhone™, or it may be a screen attached to a desktop computer or that is part of a laptop computer, for example. Such a screen may be conceptually divided into a number of windows. In some cases, one window may take up all or most of the screen. For example, in the screens shown in FIGS. 3-9, the window is considered to be the portion of the screen displaying text and, optionally as in FIG. 9, text-related graphics. In some cases, the window may be delimited by a border and may be resizable by a user. Generally the content of the window (generally including text and text-related graphics) is scrollable by a user so that after the user has read the text in the window, the text in the window can be scrolled up to bring additional text into the window at the bottom, while text at the top scrolls out of the window. A user may also be able to zoom and unzoom the content of the window, for example, by placing two fingers on a touch screen and either sliding them apart or together.

In a simple case, as shown in FIGS. 3-8, the window may only contain text on a uniform background. Typically the text is black or grey and the background is white, but this may vary. In such a case, the method involves first identifying an initial portion of the window that, preferably, contains only text. Preferably, the identified initial window portion is selected to be at least as large as a pre-determined minimum size specification for the advert, and the advert is scaled to fit in the identified initial window portion, normally so that the advert is as large as possible while still fitting within the identified initial window portion.

In a preferred embodiment, the identified initial window portion may be a portion centred on the centre of the window, and may be chosen to be as large as possible, while only encompassing text. If the advert has a maximum specified allowable size, then the identified initial window portion will be selected not to exceed that size. In the example shown in FIG. 4a, the window contains dark black text and the initial window portion at the centre of the window was selected that is equal to the maximum size of the advert 100 so that the advert 100 as shown in FIG. 4a is shown at its maximum specified size.

After the initial window portion has been identified, the advert is then inserted into the initial window portion. In general, this involves three steps. First the advert is scaled to the largest size that can fit in the initial window portion. Second, if necessary, the colour of the advert is adjusted so that the advert is distinguishable from both the text and the background. In some cases, this may involve lightening the advert so that it appears to be translucent. In the case of FIG. 4a, where the text is black and the background white, a relatively light blue colour has been selected for the advert.

Third, the advert is inserted into the initial window portion behind the text. By selecting or adjusting the colour of the advert so that the advert is distinguishable from both the text and the background, it is meant that the advert is selected or adjusted so that the text is readable by a normal user when the text is in front of the advert. In order for the text to be readable, portions of the text in front of the advert necessarily obstruct portions of the advert behind the obstructing text portions. After the advert has been inserted, the user can still read the displayed text and can scroll the content. Generally, which may be the default, as the user scrolls the content, the advert is maintained in the same central location in the window relative to the window. The web designer who is responsible for the contents of the window may be permitted to specify the location of the advert in the window. For example, the web designer may choose to require the advert to stay near the top of the window for a particular period.

Figure 4B:
FIG. 4*b* shows a later version of the screen of FIG. 4*a* with the advert darkened so that the advert further obstructs the text.

In a preferred embodiment of the invention, after the advert has been initially displayed for some amount of time, the colour of the advert and/or of the obstructing text portions are adjusted so that the advert becomes more prominent. Other attributes of the text may also be modified, for example to make it bolder, or larger, or otherwise change the font. Such adjustments may be done at a particular time, or may be done, for example, by continuously varying attributes of the advert or text, for example by varying the colour of the advert over a period of time. FIG. 4b shows a later version of the screen of FIG. 4a in which the colour of the advert has adjusted to darken the advert. This could have been done in a single step to alter the darkness of the advert as shown in FIG. 4a to that shown in FIG. 4b, for example 10 seconds after the advert first appeared. Alternatively, the darkness of the advert may have been continuously and monotonically increased over a 10 second period, for example. The increase may be done at a linear rate or, for example, at a rate that increases over time.

Similarly FIG. 4c shows the screen of FIG. 4a at a time subsequent to that of FIG. 4b at which time the advert has been further darkened so that the advert is more prominent and it is more difficult to read the obstructing text. This can be continued until the advert becomes black, the same colour as the text, so that the text in front of the advert is no longer readable. Alternately, as shown in FIG. 4d, at some later time, the advert may be brought forward so that it is in front of the text. At this point the white border (or background) of the advert also blocks text behind the advert. In general, the border of the advert (i.e. those portions not intended to be initially visible to a user) are adjusted when the advert is first inserted to have the same colour as the background of the window.

After the advert has been adjusted to block part of the text, and it has blocked the text for a certain duration, such as 5 seconds, the advert may subsequently be removed completely, or the progression from FIGS. 4a to 4d may, for example, be reversed so that the user can once again read the underlying text.

FIG. 5 shows an example where it was desired to place the advert 300 of FIG. 3a behind the text in FIG. 5. Because the outer portion of the advert 300 was too close to the colour of the text, before it was inserted the colour of the outer portion of the advert was adjusted to the colour of the advert 301 shown in FIG. 3b.

FIG. 6 shows a scenario similar to FIG. 5, but in which the original text was grey. Since the grey text would not have been easily readable in front of the adjusted advert 301, a portion of the text near the advert, including all the obstructing text in front of the advert, was adjusted to darken it, making it black, so that the obstructing text in FIG. 6 is readable in front of the advert 301. If the user were to scroll the content of the window in FIG. 6, the advert 301 may be retained in the same location, but the new text that moves over the advert 301 would be made black, and the text that previously was in front of the advert 301, but is no longer, would revert to its original grey colour.

FIG. 7 shows an example similar to FIG. 6, but where the advert 200 of FIG. 2 is shown. Since the outer portion of the advert 200 is grey, the text in front of the advert 200 was converted to black when the advert 200 was inserted.

FIG. 8 shows a sequence of three screens at different times where the luminance of the advert 301 is varied in two ways. In FIG. 8b, the outer portion of the advert 300 has been darkened relative to the advert 301 of FIG. 8a, so that the advert is more prominent and the outer portion of the advert 300 obstructs a portion of the text, although a portion of the text is still readable in front of the blue inner portion of the advert 300. At a later time the advert 300 is brought forward as shown in FIG. 8c. It will be noted that in FIG. 8c, no rectangular border is visible as in FIG. 4d. The method of FIG. 8c is generally not preferred because it is more difficult to implement than methods that can be used to produce the screen of FIG. 4d, requiring more computation and making it more difficult to scroll the text underneath the advert 300. However, adverts are not generally maintained fully in front of the text, as in FIGS. 4c and 8b, for long as this is likely to annoy the user reading the underlying text.

Figure 9C:
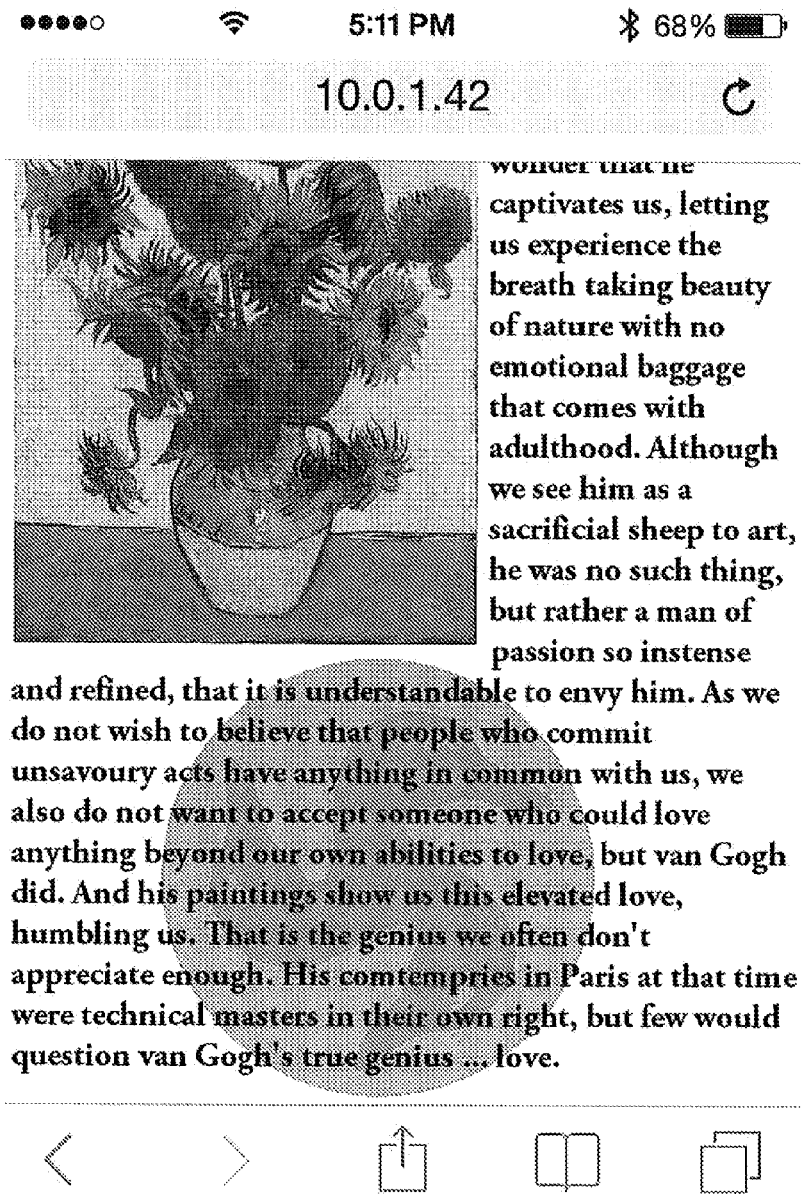
FIG. 9*c* shows the screen of FIG. 9*b* after a user has further scrolled the text and text-related graphic and the advert of FIG. 2 has been scaled and moved.

Rather than having only text, it is very common for the content of a window to have both text and text-related graphics, such as in the window shown in FIG. 9a, which includes text about the artist van Gogh as well as a text-related graphic showing one of his paintings, which may be directly or indirectly referenced in the text. With such content, it is preferred that the identified initial window portion for insertion of the advert 200 contain only text and not contain any portion of the text-related graphics. In the case of FIG. 9a, the identified initial window portion is above the text-related graphic, towards the middle (left to right) of the window. The vertical extent of the identified initial window portion was constrained by the text-related graphic so that the advert 200 has been scaled down in size to fit in the identified initial window portion. As the user scrolls the window content up and the top portion of the text scrolls out of the window, the vertical extent of the text above the text-related graphic decreases. The advert 200 may move up along with the text, being reduced in size as the content scrolls. As the window scrolls, another window portion being of sufficient size and shape to accommodate the advert is newly identified. This may be constrained to be as close as possible to the previous window portion, as long as this does not require scaling the advert 200 below its minimum acceptable size. As the text moves up then in FIG. 9a, the advert may move up also, and be scaled down in size to fit within each newly identified window portion above the text-related graphic until no window portion above the text-related graphic can be identified that allows the advert to be displayed at its minimum specified size. At this point, a new window portion beside the text-related graphic may be identified that is close to the middle (top to bottom) of the window as possible, as shown in FIG. 9b. (Alternatively, a new window portion as close as possible to the previous location of the advert may be identified.) The advert is then rescaled to fit in the newly identified window portion and inserted in it as shown in FIG. 9b. As the user continues to scroll the window, a new window portion of larger size may be identified below the text-related graphic and the advert 200 may then be scaled and moved into that newly identified window portion, as shown in FIG. 9c. As the user continues to scroll the content, and new text-related graphics appear in the window, the advert 200 may be repeatedly rescaled and moved to avoid obstructing the text-related graphics. Web designers may be permitted to specify, for example, that an advert stay in the left (or right) portion of the display window, which is similar to giving them the control to have the advert stay at the top or at the bottom as noted above.

Often users will scroll a window quickly for a period, scanning visual cues that scroll through the window, in order to find a particular portion of the content. For example, the user may be looking for a particular heading or graphic in the content. When a user scrolls the content of a window at more than a first pre-determined rate or speed, the generation of background adverts may be suppressed, or adverts may be brought to the foreground, until the rate is reduced to below a second pre-determined rate. The first pre-determined rate may be a rate that indicates that the user is probably not reading the text but rather is skimming through the content to find a particular portion.

In one embodiment, when, for example, an advert is initially near the centre of the window, behind text, and the user starts scrolling the window at a rate, for example, of more than two lines per second (so that more than two lines scroll out of the window at the top or bottom, while more than two lines scroll into the window at the bottom or top, assuming there are lines of text throughout the window), then the advert may be moved to a pre-determined position, such as near the top of the window if the user is scrolling down, and the advert may be brought in front of the text. It may also be resized, although is generally made to not take up the majority of the window in order to allow the user to see enough of the window contents to be able to decide when to stop searching.

When the scroll rate then goes back down below the second pre-determined rate, such as two lines per second, the advert may then be relocated into a central location, behind text, as would normally be done. While the advert is in front of the contents of the window, the location of the advert would not be selected so that the advert only blocks text; in this case, the advert may also block graphics in the window contents as they scroll underneath the advert and the advert may be maintained at a fixed position. The first pre-determined rate that triggers the movement of adverts in front of the text may be a different rate than the second rate that triggers the system to stop displaying the advert in front of the window contents, although generally the two pre-determined rates are the same.

A simple representative approach for inserting an advert into scrolling content in a window having a uniform background colour is shown below in high-level pseudocode. This is just a simple example embodiment where the text is assumed to be black, or that it is sufficient for readability to make it black. The advert is presumed to have been provided by an advertiser with default colour values and, generally, at the maximum size/resolution at which the advert will be displayed.

Identify the largest initial portion of the window containing only text that is closest to the window centre that is large enough to accommodate the advert at a size greater than or equal to its minimum allowable size, and which is not larger than the maximum allowable size;
    Scale the advert to the largest size that can fit in the identified initial window portion;
    If required, adjust the colour of the advert so that black text is readable in front of the advert;
    If the text in the identified initial window portion is not black, convert it to be black;
    If required, adjust the colour of the border (or background portion) of the advert to be the same as the background of the window;
    Insert the advert in the identified initial window portion behind the text;
    While window contents scroll do {
        Identify a new window portion being the largest portion of the window closest to the previous window portion in which the advert was displayed, and containing only text, that is large enough to accommodate the advert at a size greater than or equal to its minimum allowable size, and which is not larger than the maximum allowable size of the advert, if any;
        If the advert is currently being displayed, remove the advert from the previous portion;
        If a suitable new window portion was identified, then scale the advert to the largest size that can fit in the newly identified window portion and insert the advert in the newly identified window portion behind the text;
        If required, adjust the text so that portions of the text that were in the previous window portion, but are not in the newly identified window portion, are returned to their original colour, and portions of the text that are in the newly identified window portion, are all black;
    }

Resampling to scale an advert is preferably done locally by the device being used to display the text, such as a mobile phone or e-reader.

The device may or may not be online (i.e. connected to the internet). If it is online, then each user can be targeted with adverts most likely to be of interest to them, and which may be selected to be relevant to the content displayed in the window.

It is generally preferred that the advert is placed in a portion of the window containing the centre of the window. If this is not possible, then it is preferred to place the advert as close as possible to the centre. However, in some cases, the advert may be intentionally moved over time, independent of the contents of the window. For example, the advert may be initially displayed near the left of the window and then continuously moved to the right, until it passes out of the window. Such movement may be used to draw the user's attention to the advert, while not obstructing any text to the extent that it is not readable. The duration that the advert is displayed for, the speed at which it moves, and the path it moves through may be pre-determined, although if text-related graphics are present in the window, then the path may be automatically adjusted to avoid those graphics.

The colour of the advert may also be varied to make the advert more prominent. By referring to varying the colour of the advert, this is intended to include the possibility of differently varying the colour (or any component of the colour) of the entire advert or alternatively of one or more portions of the advert, where different variations may be applied to different portions. By making the advert more prominent, it is meant that the advert is adjusted so that a user is more likely to take notice of it in the context of the content (text and graphics) displayed in the window. A simple way of doing this is to increase the darkness of the advert (i.e. make it darker) without changing the text and graphics content of the window. Another way is to bring the advert forward so that it is in front of the text in the window as in FIG. 4d. Alternatively the hue of at least a portion the advert may be changed to a more noticeable colour, such as from blue to bright red. Making an advert more prominent may also include making it larger, possibly in combination with colour adjustments that make it even more prominent.

The content of a window may be zoomable and unzoomable so that a user can alter the size of content of the window. Much like when a user scrolls content, the position and size of the advert may be adjusted as the users zooms in and out. Every time the size changes, a new window portion may be identified and the advert re-scaled and moved to the newly identified window portion. Such newly identified window portions may be chosen, for example, to be as close as possible to the previous portion in which the advert was displayed, or as close as possible to the centre of the window.

An advert may be configured so that a user can click on it, for example to bring it in front of the text, or to take the user to a web page provider by the advertiser.

People reading are often engrossed and do not wish to be distracted from it. However, such a reader may observe an advert passing underneath the text, and later may want to look at that advert. Therefore, the history of adverts may be shown, such as via an active icon, which will call up any advert that passed underneath. If the user activates the advert history, then the user expressing a wish to see the adverts, so adverts will simply appear up front.

Although the term advert is used herein, an advert may be any message, whether commercial in nature or not, and whether or not related to any company or product or service for sale or rent. For example, an advert may be a recorded video or photograph(s) of a personal nature, such as a birthday greeting. Such adverts may be provided by peer to peer private communication for example. This would normally require the receiver to authorize a particular sender to provide adverts to the receiver's device. If the advert is received while the receiver is viewing content containing text, then the advert may be immediately displayed behind the content in the same manner as discussed above.

An advert may include text, although this is not preferred. An advert may be a single graphic image, as shown in the figures, or may, for example, comprise a sequence of such images and comprise instructions for displaying those images. For example, a sequence of 10 images may be played in sequence, each being displayed for N seconds and the first image is repeated after the last one has been displayed. N may be a parameter that can be adjusted by a web designer, having a default value, such as one second. An advert may also include one or more video clips. Audio may also be associated with the advert, although this is not generally preferred. Although adverts are preferably defined by a rectangular pixel map, this is not essential and the pixel map may have any shape, or be specified in any suitable manner.

It should be noted that although it is preferred that the colour or other attributes of an advert be adjusted after the advert is initially inserted behind text in a window, the adjustment being for the purpose of making the advert more prominent, this is not required in all embodiments. In some embodiments, the colour of the advert may remain the same at all times. This may be appropriate for example when the text is all black and the colour of the advert does not significantly obstruct the reading of black text by a normal user. Although it is generally desirable to make the advert more prominent at times to help ensure that the user takes notice of the advert, this can also be achieved, for example, by moving and resisting the advert. For example, as a user scrolls though text with text-related graphics, and the advert is moved and resealed as described above to avoid the graphics, the movement of the advert may make it sufficiently prominent that further measures to increase its prominence by adjusting the colour are not required or desired. In other embodiments, the advert may simply be moved around behind the text, or the size of the advert may be varied, such as to increase and decrease its size in a periodic fashion without altering the colour.

Generally, a computer, computer system, computing device, client or server, as will be well understood by a person skilled in the art, includes one or more than one computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network or an electronic communications network. When they are relatively close together the network may be a local area network (LAN), for example, using Ethernet. When they are remotely located, the network may be a wide area network (WAN), such as the Internet, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.). Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. In the case of software, the executable instructions are thereby tangibly embodied on the computer-readable memory. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

It should be understood that the above-described embodiments of the present invention, particularly, any "preferred"

embodiments, are only examples of implementations, merely set forth for a clear understanding of the principles of the invention. Many variations and modifications may be made to the above-described embodiment(s) of the invention as will be evident to those skilled in the art.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

Where, in this document, including the claims, the conjunction "or" is used in a list, such as in "w is done by performing x, performing y or by performing z", unless otherwise clearly implied, the "or" is non-exclusive. In this example, w may therefore be done by performing all of x, y and z, performing any two of x, y and z, or performing any one of x, y and z, unless the simultaneous performance is not possible or does not make sense.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A method for inserting a digital advert into a window by a computer processor for presenting an advert to a user, the window being displayed on a screen and having a centre and containing content including text, the screen being viewed by the user, the advert having a size, and having one or more portions, each portion having a colour, the advert having a location relative to the window and the content, the method comprising the steps of:
   (a) identifying an initial portion of the window;
   (b) inserting the advert into the identified initial window portion behind a portion of the content so that any text in front of the advert is readable by the user; and
   (c) subsequently, while the advert is displayed on the screen being viewed by the user, adjusting the colour of at least one portion of the advert so that the advert becomes more prominent,
   wherein a user can scroll the content displayed in the window and when the user scrolls the content, a portion of the window being at least as large as a pre-determined minimum size specification associated with the advert is newly identified, and, in response to the movement of the content in the window caused by the scrolling, the advert is moved to the newly identified window portion behind a different portion of the content so that any text in front of the advert is readable by the user.

2. The method of claim 1, wherein the window further contains text-related graphics, and the initial window portion contains only text and does not contain any portion of the text-related graphics.

3. The method of claim 1, wherein the size of the advert is also subsequently adjusted to make the advert more prominent.

4. The method of claim 1, wherein the identified initial window portion is selected to be at least as large as a pre-determined minimum size specification associated with the advert, and the advert is scaled to fit in the identified initial window portion.

5. The method of claim 4, wherein the identified initial window portion is selected to be centred on a point as close as possible to the centre of the window such that the window portion contains only text.

6. The method of claim 2, wherein the identified initial window portion is selected to be as large as possible.

7. The method of claim 2, wherein inserting the advert into the identified initial window portion comprises adjusting the colour of at least one portion of the advert or adjusting attributes of a portion of the text so that the text is readable by the user.

8. The method of claim 2, wherein inserting the advert into the identified initial window portion comprises scaling the size of the advert to the largest size that will fit in the identified initial window portion.

9. The method of claim 1, wherein the advert is made more prominent by darkening at least one portion of the advert.

10. The method of claim 9, wherein the darkness of the advert is continuously increased for a pre-determined period of time.

11. The method of claim 2, wherein, subsequent to inserting the advert into the identified initial window portion behind the text, the advert is made more prominent by placing the advert in front of the text for a pre-determined period of time.

12. The method of claim 1, wherein the advert is maintained in the window for a pre-determined period of time, and is then removed from the window.

13. The method of claim 2, wherein inserting the advert into the identified initial window portion comprises lightening the advert so that the advert appears to be translucent and so that the text is readable by the user.

14. The method of claim 1, wherein the window further contains text-related graphics, and the initial window portion and newly identified window portions contain only text and do not contain any portion of the text-related graphics.

15. The method of claim 14, wherein the newly identified window portion is selected to be as close as possible to the previous location of the advert.

16. The method of claim 14, wherein the size of one or more of the newly identified window portions is chosen to be as large as possible, and the advert is scaled up or down to the largest size that fits in the newly identified window portion.

17. The method of claim 14, wherein after the advert is moved, the colour of at least one portion of the advert is adjusted or one or more attributes of a portion of the text are adjusted so that the text is readable by the user.

18. The method of claim 2, wherein a user can zoom the window, and when the user zooms the window, a portion of the window containing only text, the window portion being at least as large as a pre-determined minimum size specification associated with the advert, is newly identified, and the advert is scaled to fit in the newly identified window portion and is moved to the newly identified window portion behind the text so that the text is readable by the user.

19. The method of claim 18, wherein the newly identified window portion is selected to be as close as possible to the previous location of the advert.

20. The method of claim 1, wherein the location of the advert is moved over time within the window, independent of any user actions.

21. The method of claim 1, wherein a user can scroll content displayed in the window, and if the user scrolls the content at a rate exceeding a first pre-determined rate, then the advert is moved in front of the contents until the rate of scrolling drops below a second pre-determined rate.

22. An advertising system for displaying an advert to a user, the advert having a size and having one or more portions, each portion having a colour, the system comprising:

(a) a computer processor;

(b) a display screen viewable by the user on which the processor can display content;

(c) a non-transitory memory readable by the processor; and (d) software stored in the memory for execution by the processor, the software being configured to cause the processor to:

(i) display on the screen being viewed by the user a window containing content including text;

(ii) identify an initial portion of the window;

(iii) insert the advert into the identified initial window portion behind a portion of the content so that any text in front of the advert is readable by the user; and (iv) subsequently, while the advert is displayed on the screen being viewed by the user, adjust the colour of at least one portion of the advert so that the advert becomes more prominent, wherein a user can scroll the content displayed in the window, and when the user scrolls the content, a portion of the window being at least as large as a pre-determined minimum size specification associated with the advert is newly identified, and, in response to the movement of the content in the window caused by the scrolling, the advert is moved to the newly identified window portion behind a different portion of the content so that any text in front of the advert is readable by the user.

23. The system of claim 22, wherein the window further contains text-related graphics, and the initial window portion contains only text and does not contain any portion of the text-related graphics, and wherein the identified initial window portion is selected to be at least as large as a pre-determined minimum size specification associated with the advert, and the advert is scaled to fit in the identified initial window portion.

24. The system of claim 22, wherein a user can scroll content displayed in the window, and if the user scrolls the content at a rate exceeding a first pre-determined rate, then the advert is moved in front of the contents until the rate of scrolling drops below a second pre-determined rate.

* * * * *